United States Patent [19]
Work et al.

[11] Patent Number: 5,379,382
[45] Date of Patent: Jan. 3, 1995

[54] UNI AND BI-DIRECTIONAL SIGNAL TRANSFER MODES IN PERIPHERAL CONTROLLER AND METHOD OF OPERATING SAME

[75] Inventors: Gordon S. Work, Warrington; Gareth J. Jones, Manchester; Peter A. Albiez, Cheshire, all of United Kingdom

[73] Assignee: Pilkington Micro-Electronics Limited, United Kingdom

[21] Appl. No.: 871,518

[22] Filed: Apr. 21, 1992

[30] Foreign Application Priority Data

Apr. 22, 1991 [GB] United Kingdom ............. 9108599

[51] Int. Cl.6 ......................................... G06F 13/00
[52] U.S. Cl. ................................ 395/275; 395/500;
                                 364/238.3; 364/240.8; 364/DIG. 1
[58] Field of Search ............. 395/200, 275, 325, 500

[56] References Cited

U.S. PATENT DOCUMENTS 4,641,261  2/1987  Dwyer et al. .
4,972,470  11/1990 Farago ............................ 395/275
5,111,423  5/1992  Kopec, Jr. et al. ............... 395/500

FOREIGN PATENT DOCUMENTS 0367284  5/1990  European Pat. Off. .
WO83/01322  4/1983  WIPO .

Primary Examiner—Robert L. Richardson
Attorney, Agent, or Firm—Burns, Doane, Swecker & Mathis

[57] ABSTRACT

A peripheral controller is described which is suitable for connecting a selected one of a plurality of peripheral devices to a computer system. The peripheral controller comprises programmable bidirectional line driver/receiver devices which can be operated in an input only mode, an output only mode or a bidirectional mode and which can be set into an appropriate mode by configuration control data sent from the computer system to the peripheral controller. The peripheral controller also includes a re-configurable logic array which can be configured under the control of the configuration control data to implement a particular interface required for the selected peripheral device. This increases the efficiency of use of a peripheral interface.

18 Claims, 14 Drawing Sheets

UNI AND BI-DIRECTIONAL SIGNAL TRANSFER MODES IN PERIPHERAL CONTROLLER AND METHOD OF OPERATING SAME

FIELD OF THE INVENTION

The present invention relates to computer system architectures and is more particularly concerned with a peripheral controller which is connected between a host computer system and the peripheral equipment of the system.

BACKGROUND OF THE INVENTION

The flexibility of any microcomputer system is determined by the number and variety of the peripheral devices that can be connected to and used by the processor of the host computer system.

Desk top microcomputers consist essentially of a host computer system having a microprocessor, a memory and a direct memory access controller, interconnected by a system of busses comprising an address bus, a data bus and a control bus, together with interfaces to connect the host computer system to peripheral devices.

The peripheral devices of such systems can be used to provide input data (e.g. a scanner) for the microprocessor or to accept output data (e.g. a printer) from the microprocessor. Peripheral devices are also used for file storage which the microprocessor can both read from and write to.

In order to connect a peripheral device to the microprocessor bus system a peripheral interface is required for each peripheral device. Externally each interface takes the form of an electrical connector socket which brings the electronic signals, at the appropriate voltage levels, to the specified pin positions. Internally a peripheral interface is required to provide an intercommunication mechanism allowing the microprocessor to operate and communicate with the peripheral device using control and data signals on the microprocessor bus. The peripheral interface may be a dedicated interface arrangement, specific to a peripheral device, or a general purpose interface, usable with one of a number of different peripheral devices. There are two main types of general purpose interfaces: parallel and serial.

The parallel interface comprises a number of data ports (typically eight or sixteen) permitting the transfer of eight or sixteen bit words simultaneously, together with data flow control and status signal paths. This type of parallel interface is used for keyboard and printer interfaces, for example, and can be adapted for use with mass storage devices, robot arms, motors, valves or lamp-displays. One such interface, originally developed for printers, is referred to as the Centronics interface.

The serial interface uses a single wire for transmitting data one bit at a time to a receiver. Serial interfaces normally conform to internationally agreed standards (such as RS-232C or RS-449) which among other things, specify connector size, allocation of pins, voltage levels and communication protocols (e.g. rates of transmitting bits). RS-232C interfaces usually provide both a transmitter and a receiver circuit which are capable of independent and simultaneous operation.

Clearly, the parallel and serial general purpose interfaces provide a restriction upon the efficiency of the operation of a particular peripheral device which would not be applied if a dedicated interface was provided for each peripheral device. With a general purpose interface, the specified interface protocols have to be conformed to regardless of the most efficient protocol for the specific peripheral device. However, it becomes physically difficult and expensive to provide discrete dedicated interfaces for the wide range of peripheral devices which may be used with a desk top microprocessor system. Indeed most personal computers are only provided with a limited number, two with expansion up to six, of external peripheral interface connection points.

It is an object of the present invention to overcome the limitation on the provision of discrete interface devices in microcomputer systems and to enable more efficient use of an interface arrangement for such systems

SUMMARY OF THE INVENTION

According to the invention there is provided a peripheral controller suitable for connecting a selected one of a plurality of peripheral devices to a computer system comprising a processor, a memory and a direct memory access controller interconnected by a system control bus, the peripheral controller comprising a plurality of programmable line driver/receiver devices each capable of operating selectively in a unidirectional signal transfer mode in which the transfer of signals between the computer system and the selected peripheral device is in a selected one of input and output directions and in a bidirectional signal transfer mode when the transfer of said data is in both said input and output directions; and a re-configurable logic array adapted to be configured to implement a particular interface required for the selected peripheral device under the control of configuration control data generated by the processor and communicated to the peripheral controller, said configuration control data also being useable to place at least one of the programmable line driver/receiver devices into an appropriate one of said signal transfer modes whereby the peripheral controller is capable of implementing transfer of signals between the computer system and the selected peripheral device under the control of the processor.

The peripheral controller can thus be operated as a dynamic interface adapting itself, in accordance with the configuration control data, to each peripheral device and transfer required, thereby permitting more complex peripheral devices to be connected to the microprocessor bus without the requirement for the provision of individual complex dedicated hardware interfaces for each peripheral device connected. The invention provides for the more efficient use of the peripheral interface since the peripheral controller is used in each peripheral transfer operation, and is not dedicated to a particular peripheral device.

The invention advantageously may use a configurable logic array of the type disclosed in U.K. Pat. No. GB2180382B (referred to as a DPLD), which essentially consists of an array of logic cells, in the form of NAND gates and latches, interconnected under the control of switches controlled by storage node/Random Access Memory cells. The switching functions required to create a specific interface can be dynamically configured by communicating configuration control data to the storage node/RAM cells and this data is derived from stored information (held as a configuration file) accessed by the microprocessor when a peripheral transfer is called for.

When, for example, a new peripheral device is to be connected to the microcomputer system, the appropriate configuration control data to configure an interface for that peripheral device is loaded into a data area in the memory of the computer dedicated to the peripheral controller. Thereafter, whenever the system calls for the use of that peripheral device, the peripheral controller is loaded with the configuration file, which causes the programming of the line driver/receivers and the configuration of the re-configurable logic array to implement the interface required for the peripheral device selected for use, before handling the required peripheral transfer. Upon the completion of the transfer, the peripheral controller is free to be reconfigured to handle another peripheral transfer operation involving a different peripheral device and interface implementation.

The peripheral controller can include, in addition to the configurable logic array, and the programmable line driver/receiver circuitry, (i) clock generator/frequency synthesis circuitry, for providing a clock to drive synchronous circuitry implemented on the configurable logic array and to provide synchronisation between the processor bus and the peripheral controller, and (ii) communication flags, permitting the peripheral controller to create direct memory access and system interrupt requests and acknowledgements.

The peripheral controller can also include synchronisation circuitry which produces synchronisation pulses synchronous to the peripheral controller internal clocks from an asynchronous access to communication registers of the controller.

The peripheral controller can include processor bus reception registers adapted to receive configuration control data used in the peripheral controller, by way of a configuration control and data bus, to condition (a) configuration control logic (b) the programmable line driver/receiver devices, (c) the clock generator/frequency synthesis circuitry and (d) the communication flags.

The invention, together with its various features will be more readily understood from the following description of one embodiment thereof. The description should be read in conjunction with the accompanying drawings.

DESCRIPTION OF THE PREFERRED EMBODIMENT

Figure 1:
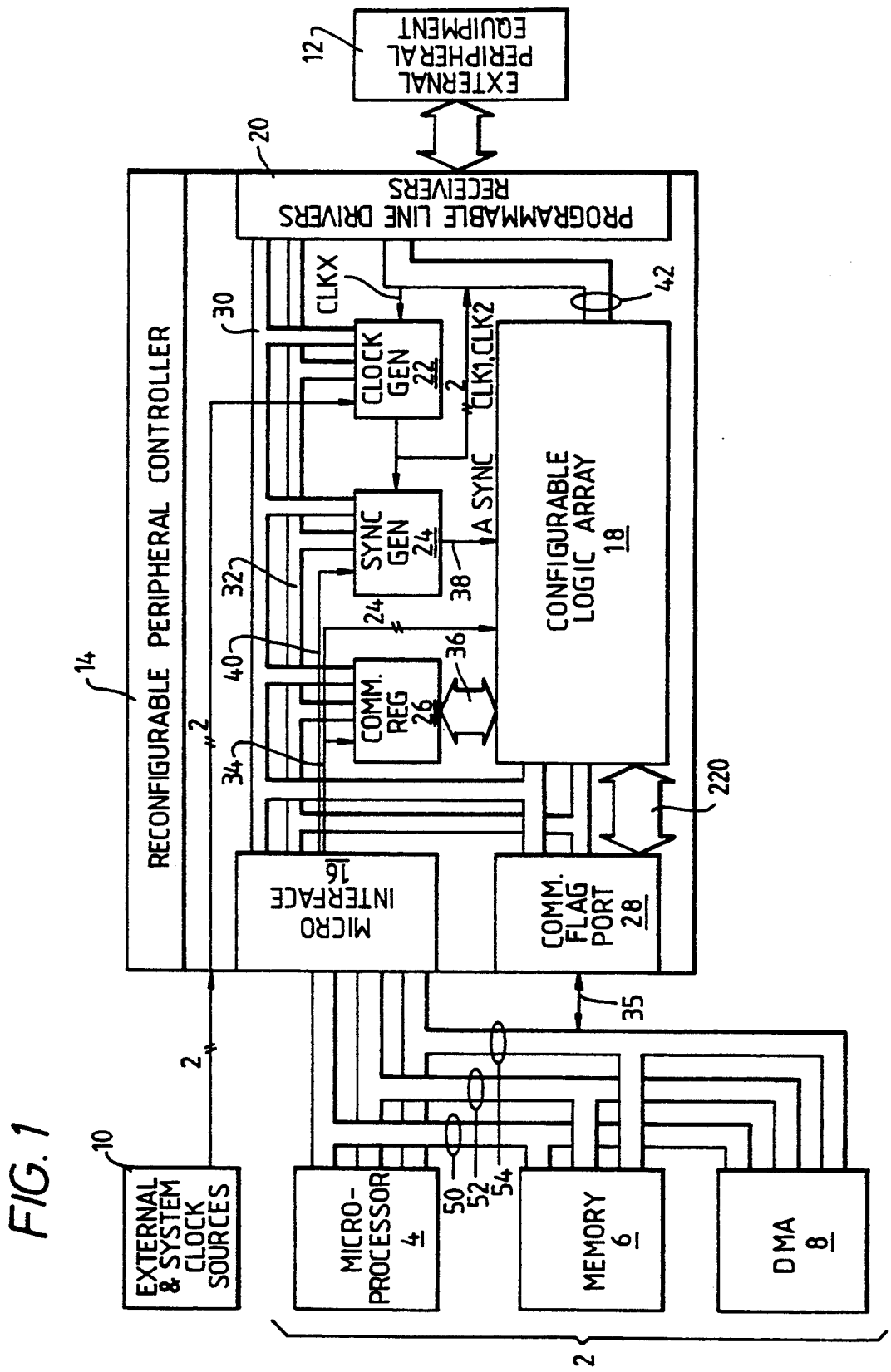
FIG. 1 shows, in block diagram form, a microcomputer system with a configurable peripheral controller.

Referring now to the drawings, FIG. 1 shows the configurable peripheral controller of the invention being used in a conventional microprocessor system 2, composed of a microprocessor 4, a memory MEM 6 and a direct memory access controller DMA8. The system 2 also contains a pair of external clock sources 10 which, for the purposes of this embodiment, may be both the microcomputer system clock and an external reference crystal oscillator. The microcomputer system 2 communicates with external peripheral equipment 12 via a re-configurable peripheral controller 14 which can be configured to act as an interface between the microcomputer system 2 and a particular peripheral device. That is, data is transferred between memory address space of the microprocessor 4 and the peripheral equipment 12. The format, (data ordering, timing, error check, voltage levels etc.) for each data transfer is varied to suit the particular requirements of an individual piece of peripheral equipment. The microprocessor 4 loads configuration data into the re-configurable peripheral controller 14 and it is this configuration data which determines the precise data format for the transfer.

There are two broad types of data used by the system of the invention:

1. Configuration Data. This data is used to configure the re-configurable peripheral controller 14 to control its performance to transfer data to and from a peripheral device in a particular format (or standard). Each configuration of the peripheral controller 14 requires the loading of the peripheral controller with a configuration file made up of a number of configuration data words.

2. Interface Data. This data is the data to be transferred to and from the particular peripheral device. It may be the data to be transferred between the microcomputer system 2 and the peripheral equipment 14 or it may be an instruction to perform a particular operation in the interface, e.g. initiate a transfer or terminate a transfer.

The re-configurable peripheral controller 14 comprises a microprocessor interface 16, a configurable logic array 18, programmable line drivers/receivers 20, a clock generator 22, synchronisation signal generator 24, communication registers 26 and a communication flag port 28.

The configurable logic array 18 in the preferred embodiment is of a form previously described in U.K. Pat. No. GB 2180382B. This describes a configurable logic device composed of an array of logic cells in the form of NAND gates and latches and referred to as a dynamically programmed logic device. Complex logic functions can be implemented by interconnecting these logic elements; the interconnect is realised utilising switches controlled by storage nodes/random access memory cells. The invention is not limited to this implementation of configurable logic arrays, but the architecture proposed in Pat. No. GB 2180382B is considered most suitable for this purpose. The preferred configurable logic array will be further described later with reference to FIGS. 6, 7 and 8.

The microprocessor interface 16 is connected to the microprocessor 4 of the host system 2 via an address bus 50, a data bus 52 and a control bus 54. The microprocessor interface 16 receives configuration data from the host microcomputer system 2 and directs the configuration data to each of functional blocks described above. The data is directed by means of a configuration control bus 30 and an internal data bus 32.

In this way, the peripheral controller 14 can be configured to implement a particular interface depending on the requirements of the particular piece of peripheral equipment to be connected.

The flag port circuitry 28 is configured under the control of data supplied to it by the configuration control bus 30 and data bus 32. The flag port circuitry 28 provides a control communication interface between the user configured peripheral controller 14 and the host microcomputer system 2. The peripheral controller 14 uses the flag port circuitry 28 to indicate that it requires attention from the host microcomputer system 2. The flag port circuitry 28 is connected to the direct memory access (DMA) controller 8 over DMA request/acknowledge and interrupt request signal paths 35 of the host microcomputer system. The re-configurable peripheral controller 14 can be controlled so that its internal circuits can be disabled by means of the microprocessor interface 16 when the particular interface is not active. It is possible, during a configuration initialisation operation, that spurious logic states and levels can be transmitted to the direct memory access controller 8 via the interrupt-signals path 35. This can cause the microprocessor to halt and, therefore, circuitry is provided to force the lines tristate. This circuitry will be described later with reference to FIG. 9.

Interface data (i.e. the data involved in a peripheral transfer operation) is transferred between the microprocessor interface 16 and the configurable logic array 18, by way of the communication registers 26. The data is read/written to the communication registers 26 by means of the internal data bus 32 under the control of register control (read/write) signals RD and WR COMM REG generated by the microprocessor interface 16 and transmitted on a communication register control bus 34. This interface data is then transferred to and from the logic array 18 on the communication register bus 36. The communication registers 26 are configurable by means of the configuration control bus 30 and internal data bus 32. The communication registers 26 can be configured to be read or write only or bidirectional. The read/write signals RD and WR COMM REG supplied to the communication registers 26 along the bus 34 are also supplied to the configurable logic array 18. In this way in operation on a peripheral transfer the interface circuit implemented by the configurable peripheral controller 14 can determine that transfers have taken place and also that data is valid.

The synchronisation signal generator 24 produces an output pulse A-SYNC along line 38 which is synchronous to the internal system clocks produced by the clock generator 22 in response to an access to the communication registers 26. This allows the re-configurable peripheral controller 14 to operate totally asynchronously from the host microcomputer system 2. In operation, the particular interface circuit implemented by the configured peripheral controller 14 can thus be operated as a clocked synchronous system running asynchronously to the host microcomputer system. The problem of metastable states occurring when communicating between two systems operating asynchronously is well documented (see for example Mead & Conway, Introduction to VLSI Systems, P237-242). to avoid this, a signal is produced by the microprocessor interface 16 indicating that an access to the communication registers 26 has taken place. This signal is applied to the synchronisation signal generator 24 over lead 40 which in turn produces a resolved output pulse A-SYNC a few clock cycles later. The resolved output pulse A-SYNC is input into the configurable logic array 18.

The clock generator 22 performs a frequency synthesis function. The clock generator can be configured to produce an output clock CLK1.CLK2 at a different, but related, frequency to an input clock. There are three sources of input clock:

1. External crystal oscillator 10 or other reference.
2. Host microcomputer system clock 10.
3. An internal clock CLKX distributed on a configurable interconnect bus 42 which interconnects the configurable logic array 18 and the programmable line drive receivers 20.

This arrangement allows different clock rates and data transfer rates, specified in many interface standards, to be supported by the re-configurable peripheral controller 14. The clock outputs CLK1.CLK2 from the clock generator 22 drive the synchronisation pulse generator 24 and also the configurable logic array 18 by way of the configurable interconnect bus 42. This will be described in more detail later.

In operation the particular interface implemented by the configured peripheral controller 14 drives/receives peripheral data from the programmable line driver/receiver circuitry 20 by way of the configurable interconnect bus 42. This bus 42 allows bidirectional communication between the line driver/receiver circuitry 20 and the configurable logic array 18. The programmable line driver/receiver circuitry 20 is configured by configuration data transmitted via the configuration control bus 30 and internal data bus 32.

Figure 2:
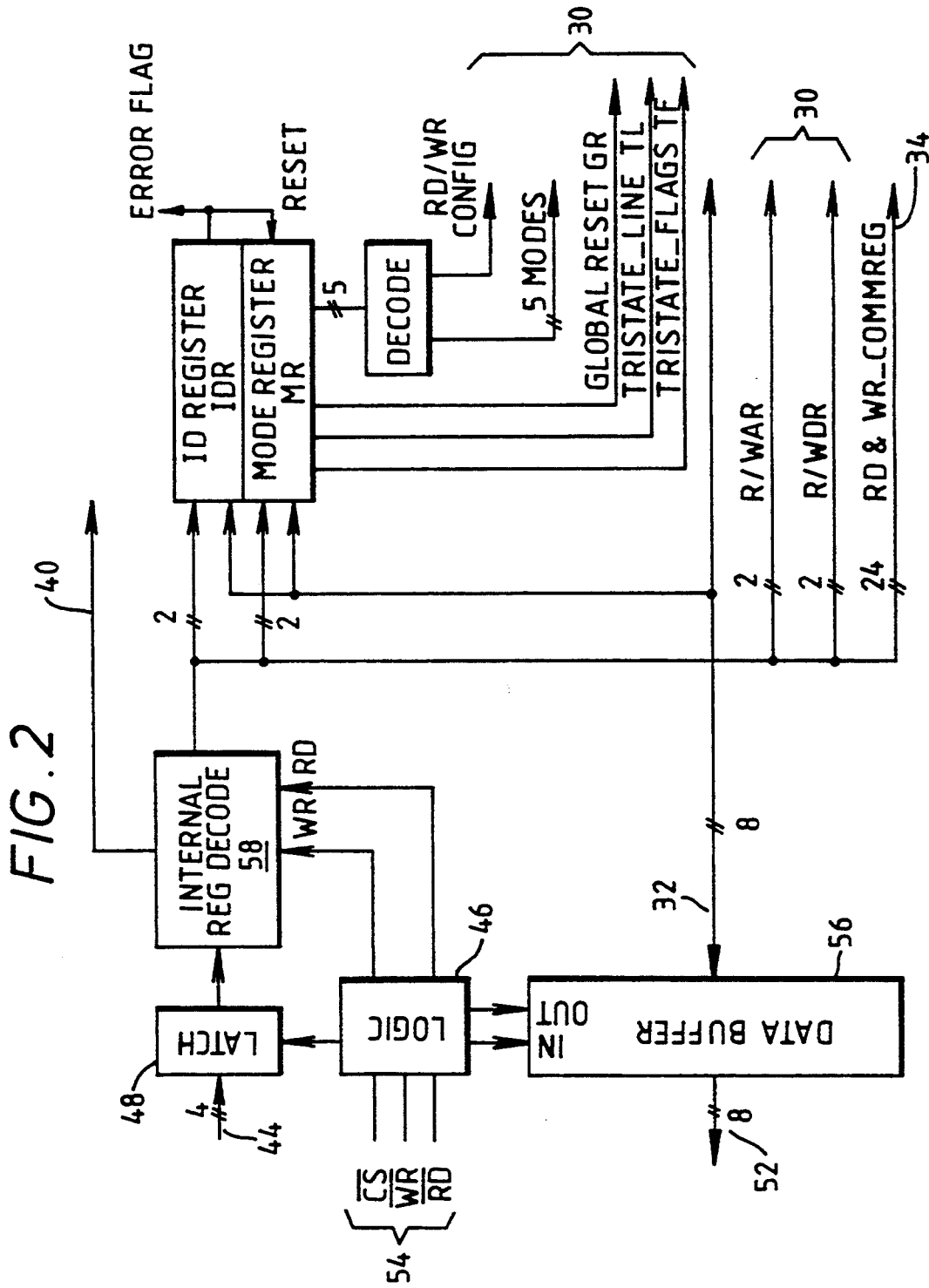
FIG. 2 shows microprocessor interface circuitry of the configurable peripheral interface device.
Figure 3:
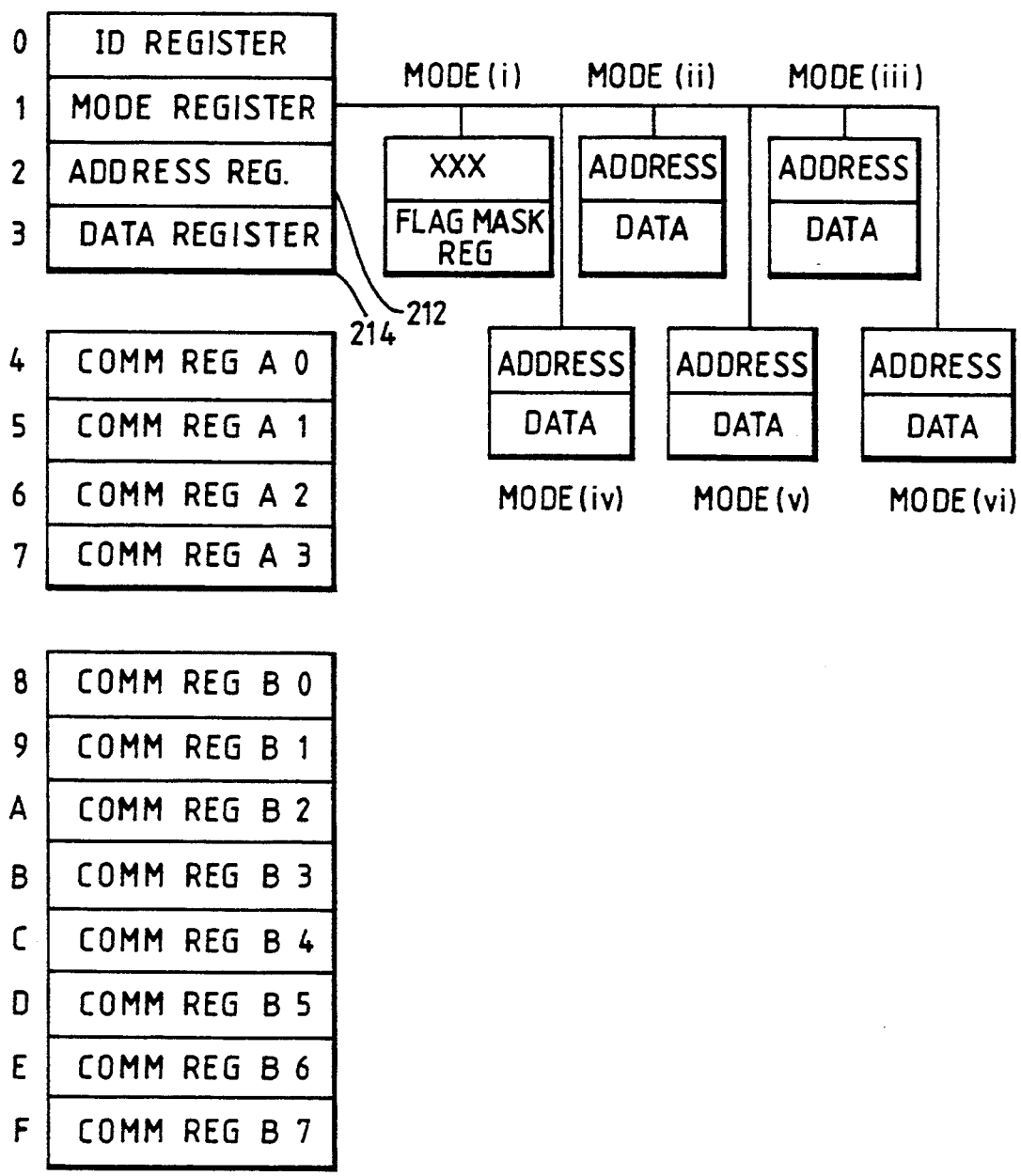
FIG. 3 shows register allocations for the microprocessor interface circuitry.

The microprocessor interface 16 will now be further described with reference to FIGS. 2 and 3. FIG. 2 shows the microprocessor interface 16 of FIG. 1 in block diagram form, whereas FIG. 3 illustrates a register map and configuration mode select arrangements for the registers in the microprocessor interface 16. Four register select lines 44 are connected to receive data from the host microcomputer system's address bus 50 and select which internal registers in the re-programmable peripheral controller 14 are to be accessed. It will be appreciated that each of the functional blocks of the controller 14 have registers for the storage of data transmitted to it. Microprocessor interface control logic 46 receives control inputs CS, WR, RD derived from the host microcomputer system control bus 54. These signals indicate to the peripheral controller 14 that it is being accessed and also the type of access taking place, namely read or write. The register select signals 44 are latched in a latch 48 during an access under the control of logic 46. Data buffer logic 56 buffers data between the host microcomputer data bus 52 and the internal data bus 32, the direction of data transfer (IN or OUT) being determined by the three control signals CS, WR, RD from the control bus 54 supplied to the control logic 46. Internal register decode circuitry 58 decodes the latched register select signals 44 to a 1 of 32 decode, that is to select one out of 16 internal register RD and WR pairs. The registers selected are illustrated in FIG. 3. The read or write status is transmitted on the configuration control bus as R/WAR for addresses and R/WDR for data. An identification register 60 contains an 8 bit identification code which is unique to the reconfigurable peripheral controller 14. Before a new configuration file is loaded into the peripheral controller 14 an 8 bit identification code from the host system 2 is written to the identification register 60. If the configuration is inappropriate for the peripheral controller an error will be flagged indicating that this has occurred. This also resets a mode register 62, putting the device into a reset mode in which access to the internal registers of the functional blocks of the peripheral controller is inhibited. The mode register 62 receives a configuration mode select byte for which reference is now made to Table I which shows the bit configurations for the mode selections which can be made by the register selection signals 44 received on the host microcomputer address bus 50. The configuration mode select byte supplied to the mode register 62 selects the mode for each use of the peripheral controller as shown in Table I. The microprocessor interface 16 has an address register location 212 which stores address data and a data register location 214 which stores the operand data in each mode of operation. FIG. 3 shows diagrammatically the internal address and data registers of the functional blocks in the controller, designated by their configuration mode numeral. Then, for example, with reference to Table I mode (ii) represents the address and data register of the configurable logic array. There are five configuration modes and one normal mode of operation (mode i). The normal mode is that in which transfer of data to peripheral devices takes place with the controller having been configured. The five configuration modes are as follows (see Table I):

(ii) Configure Logic array/communication registers.
(iii) Configure programmable Line driver/receiver Logic.
(iv) Configure clock generator.
(v) Configure Flag port.
(vi) Configure Synchronisation signal generator.

The peripheral controller 14 has the facility to read back the configuration data for test purposes and this is determined by the least significant bit in the 8-bit word. The next four least significant bits of the 8 bit code are used to select the current configuration mode. The three most significant bits are control bits (vii in Table I) which can supply signals along the configuration control bus 30 to:

a) force all configurable circuit blocks into a reset state, GLOBAL RESET GR;
b) tristate the line driver outputs, TL; and
c) similarly tristate the flag port drivers, TF.

Once in a particular configuration, subsequently communicated data words of the file can be written to registers of a particular functional block, by means of the address and data registers 212,214, the exact protocol for this varying from mode to mode. Particular data formats for specific functional blocks will be described later. The last twelve address locations in the microprocessor interface 16 are used to communicate with the communications register 26 and are referenced COMM REG A0-A3 and COMM REG B0-B7 in FIG. 3. They are used for the transfer of interface data (i.e. the data to or from the peripheral device) which is to be passed between the configurable logic array 18 and microprocessor 4.

Figure 4:
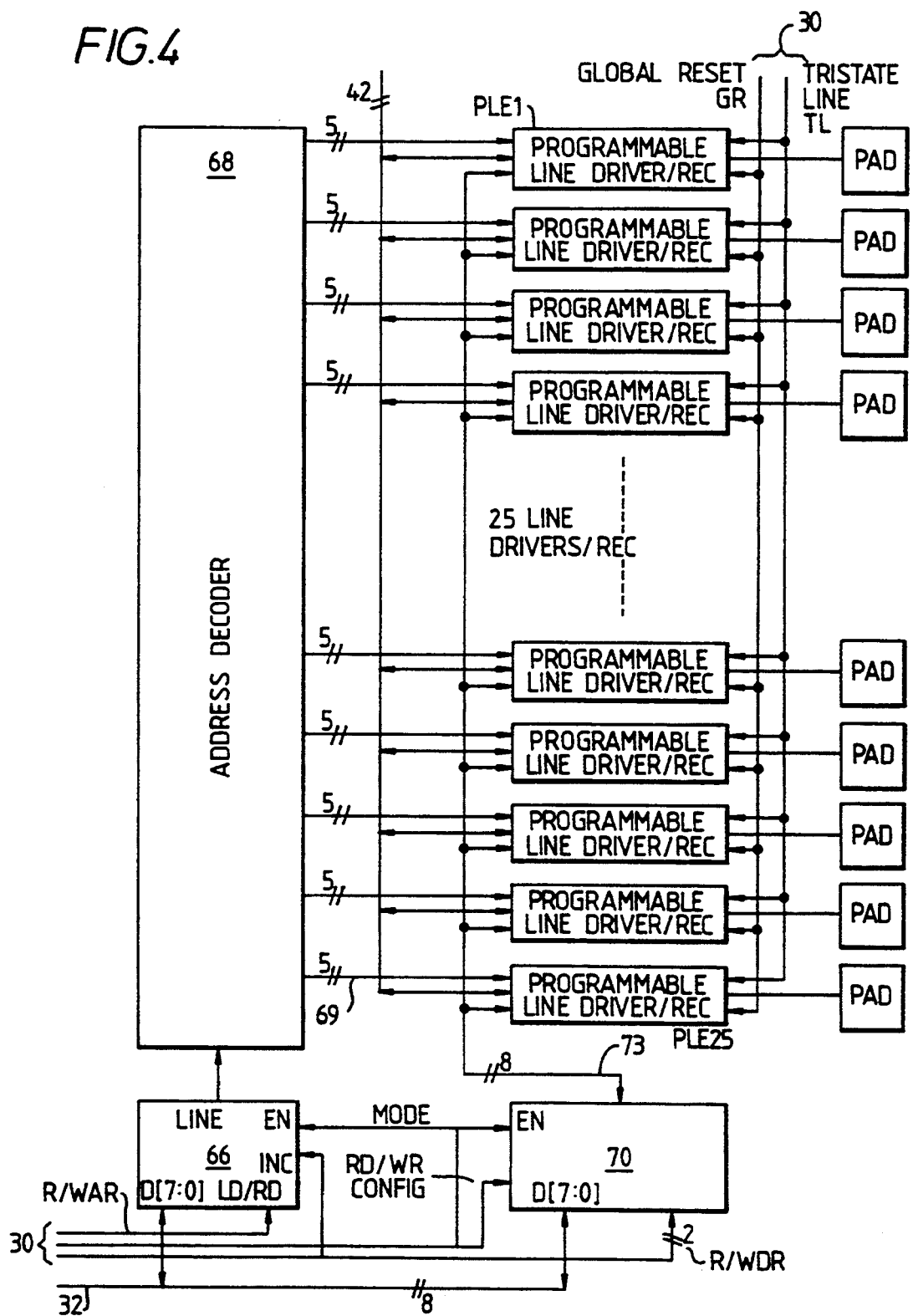
FIG. 4 shows programmable line driver/receiver circuitry.
Figure 5:
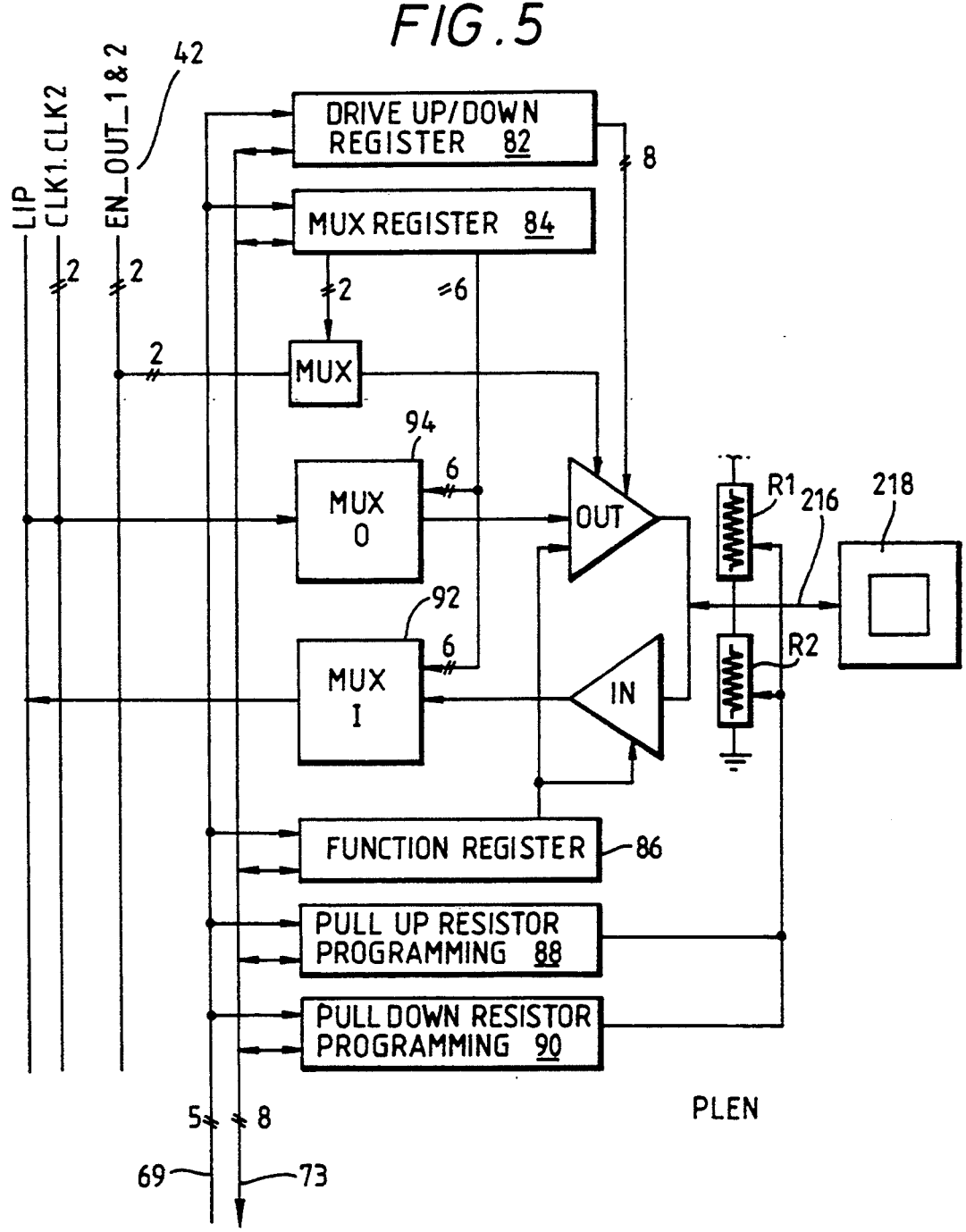
FIG. 5 shows a single programmable line driver/receiver circuit.

The Programmable line driver/receiver circuitry is shown in FIGS. 4 and 5. FIG. 4 shows twenty-five programmable line driver/receiver circuits designated PLE1-25. From the following description it will be apparent that each line driver/receiver circuit is capable of supporting signal transfer in either or both of two directions depending on the operation which is selected. That is, each circuit can operate in an input only mode, an output only mode or a bidirectional mode. In configuration mode (iii), an address byte from the configuration file, passed over the internal data bus 32, is loaded into a local address register 66. This address is decoded by an address decoder 68 to give a 1 of 125 decode, that is to select one out of five signals for each line driver, amongst 25 line drivers. The appropriate one of line driver/receiver decode lines 69 is activated. Configuration data is then loaded into an internal register inside the selected line driver through a data buffer 70 via a line driver/receiver bus 73. The facility for the address register to auto increment after every data byte read/write is provided. The type of access, either configure (write) or readback (read), is determined by the R/WDR configuration signal on the configuration control bus 30 which is input to the data buffer 70. The line drivers PLE 1 to 25 can be forced into a reset state, by using the global reset signal GR, and forced into a tristate by the tristate line signal TL from the mode register 62 in the interface illustrated in FIG. 2. For the normal mode the line drivers PLE1-25 can be individually programmed to interconnect to the configurable interconnect bus 42. As illustrated in FIG. 5, there are three types of signals on the configurable interconnect bus 42 as follows:

1. Clock Signals CLK1,CLK2.
2. Line Interconnect pairs LIP (32 pairs of separate input and output signals).
3. Enable outputs (2 signals) EN OUT 1, EN OUT 2.

In FIG. 5 a single programmable line driver/receiver PLEN is shown. Each line driver/receiver has five configuration registers drive up/down register 82, multiplexor register 84, functional register 86, ; pull up and pull down resistor programming registers 88,90. By writing to the function register 86 the functional operation may be programmed to be (i) input, (ii) output, (iii) bidirectional (controlled by the enable outputs EN OUT 1, EN OUT 2), (iv) open collector output, (v) TTL/CMOS input threshold, or (vi) tie high or tie low (drive positive or negative supply externally). The line interconnect signal pair LIP to be driven from, or onto, is selected by input and output multiplexor blocks 92 and 94 which are controlled by the multiplexor register 84. The multiplexor register 84 also controls the selection of the bidirectional control signal, EN OUT 1 and 2. The output drive capability, both pull up and down, is also programmable, by means of loading an 8-bit value into the drive up/down register 82. This is achieved by switching in a programmable number of buffer elements. Typically the output drivers have a programmable output current drive capability in the range 4mA to 50mA at standard TTL output voltage levels for high and low. Two programmable terminating resistors R1 and R2 are connected to the input/output signal 216 fed to pad 218. These typically have a programmable range of between 100ohms and 10Kohms, determined by the pull up resistor programming register 88 and pull down resistor programming register 90. The resistor implementation can be achieved by switching a bank of polysilicon resistors with a tolerance of ±/10%.

Figure 6:
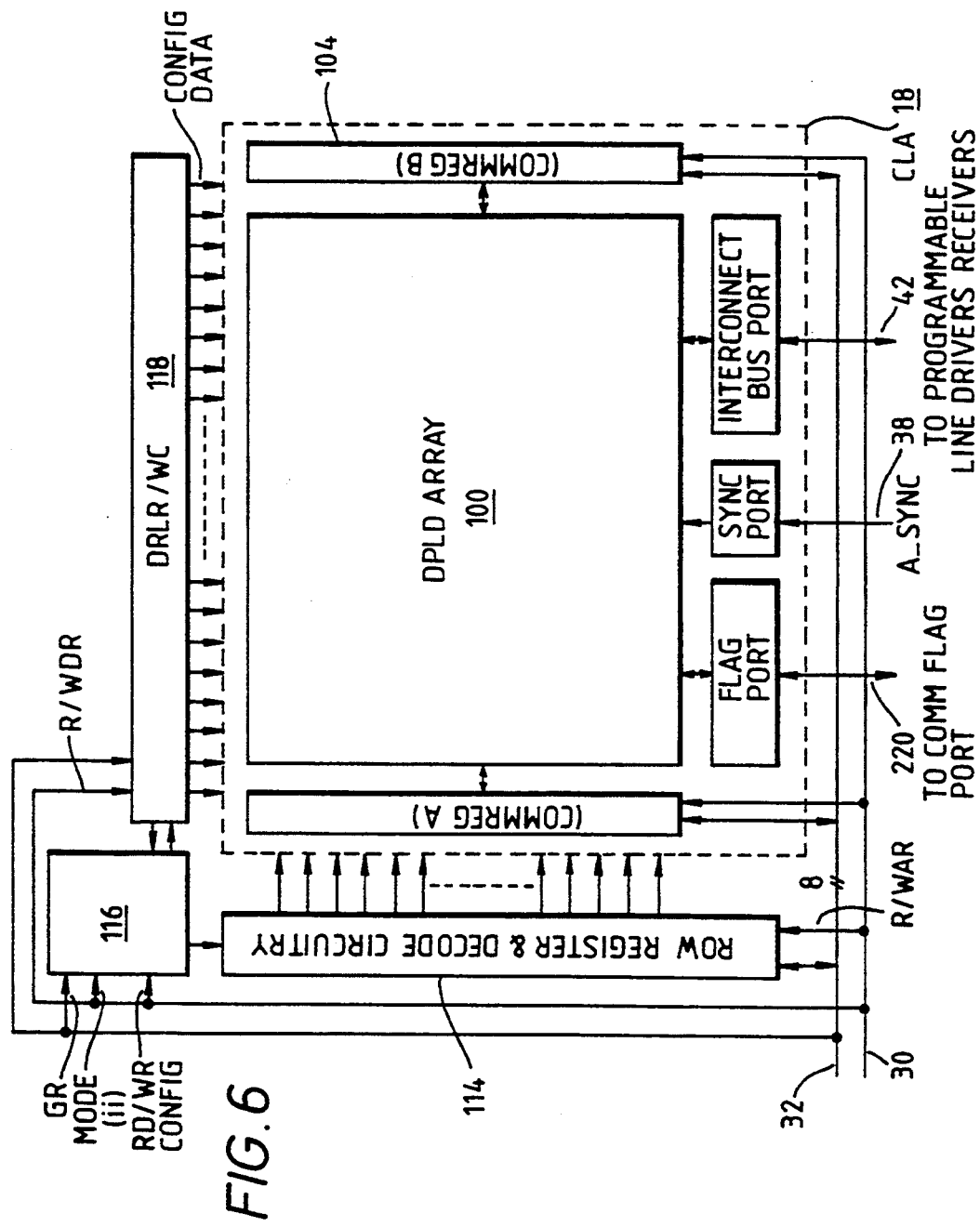
FIG. 6 shows a configurable logic array according to one embodiment of the invention using a DPLD.

FIG. 6 shows the configurable logic array 18 which shows a specific embodiment of a digital programmable logic device 100 and communication registers 102 and 104 in more detail. The communication registers 102,104 form part of the communication registers 26. In this preferred embodiment, the configuration data is loaded into the array 100 and communication registers 102 and 104 using the same internal data bus 32, i.e. for configuration purposes it is convenient to think of the communication registers as being an extension of the logic array.

Figure 7:
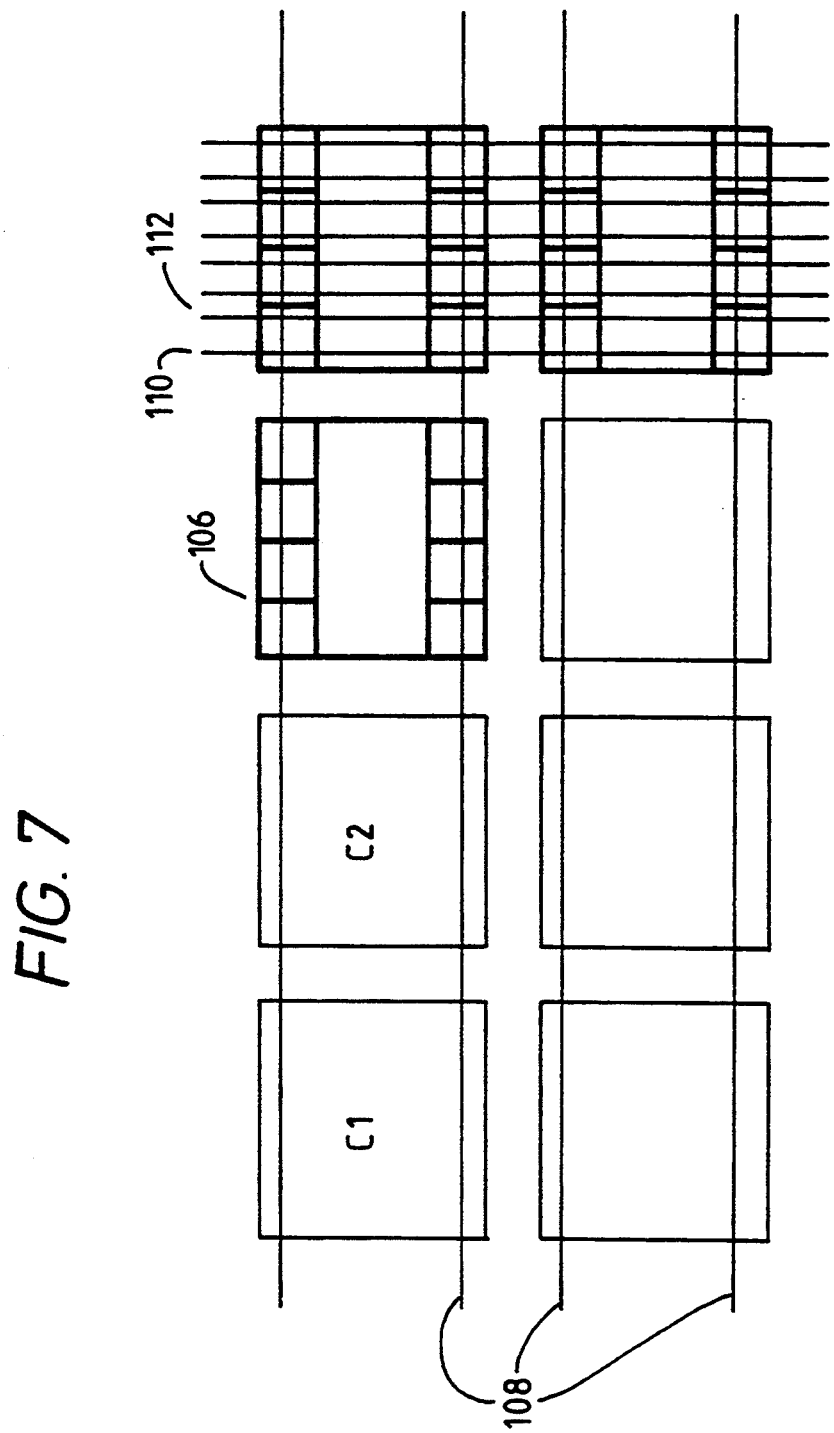
FIG. 7 shows the DPLD core cells with programming lines.

FIG. 7 shows eight core cells C1,C2 . . . of the logic device 100. In this example functionality and interconnectability of each core cell is determined by 8 RAM cells 106. Data is loaded into each RAM cell row by raising a signal on the word line 108 associated with that row and driving differential bit line pairs 110,112. The contents of the RAM cells 106 are then overwritten with the data present on the bit line pairs 110,112. RAM storage structures and the techniques used to read and write data are well known to those skilled in the art.

Referring again to FIG. 6, the RAM cell row to be configured is determined by the contents of a row register 114. The row register 114 is loaded from the internal data bus 32 by using the write address register R/WAR signal on the configuration control bus 30 (FIG. 2), when the device is in "configure logic array and communication register" mode (ii). Control logic 116 receives mode control signals from the microprocessor interface 16 via the configuration control bus 30 and enables the operation of the row register 114 according to these signals. Configuration data is loaded into a data register with Read/Write circuitry 118 from the internal data bus 32 using the write/read data reg R/WDR signal on the configuration control bus 30. The data word, output to the bitlines 110,112 (FIG. 7), is built up a byte at a time by successive accesses to the data register and read/write circuitry 118. When the last data byte is loaded a write transfer of data from the data register and read/write circuitry 118 to the RAM cell row is performed. The timing for the access is controlled by the control logic 116. The global reset signal GR to the control circuitry 116 resets the logic array 100 into a power down state.

Figure 8:
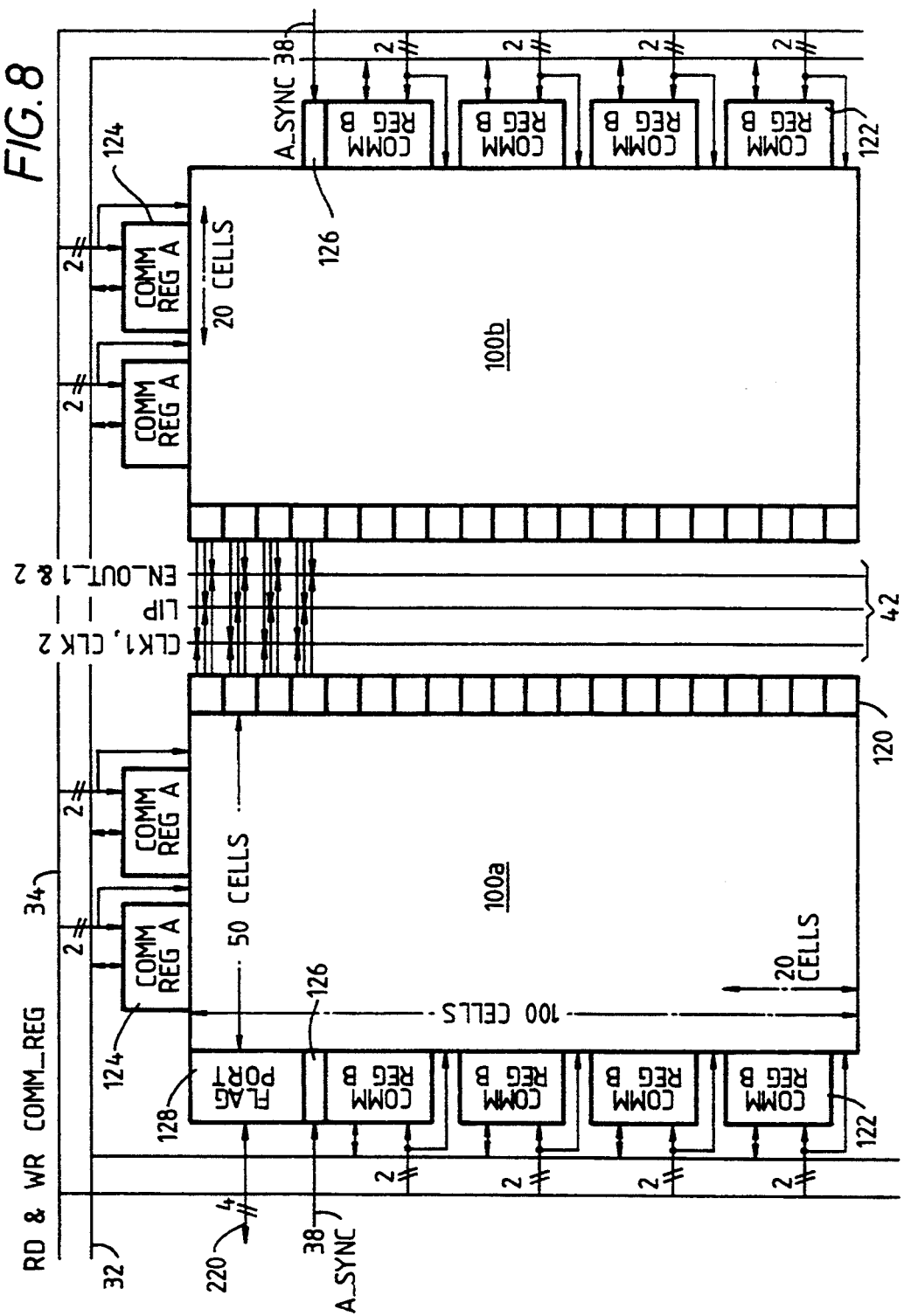
FIG. 8 shows the communication registers, configurable interconnect bus, flag port and synchronisation port associated with the DPLD logic array.

FIG. 8 shows the preferred embodiment of the array 100 split into two halves 100a, 100b by the configurable interconnect bus 42. Each half contains 5,000 core cells. The inside edge of each half 100a, 100b contains multiplexor and buffer cells 120 to connect internal logic signals from the array 100 to the configurable interconnect bus 42 to form the three types of signals referred to above, namely clock signals CLK1,CLK2 line interconnect pairs LIP, and enable output signals EN OUT 1 and 2. The outer edge of each half 100a, 100b connects to communication registers B COMMREG B 122, the upper edge to communication registers A COMMREG A 124. These registers form the registers designated 102, 104 in FIG. 6. The access synchronisation pulse A-SYNC (FIG. 1) is applied to both halves of the array via respective synchronisation ports 126. Each communication register block 122, 124 is 8 bits wide and spans 20 cells. Each bit in the communication register block spans two cells, one for an input signal path and the other for an output signal path. The communication register read/write signals RD and WR COMM REG for each communication register block 122, 124 are also applied from the microprocessor interface 16 via the communication register control bus 34. There is a flag port 128 which is 4 bits wide, and also can be configured to be input or output. The flag port 128 transmits data to and from the communication flag port 28 along bus 220.

Figure 9:
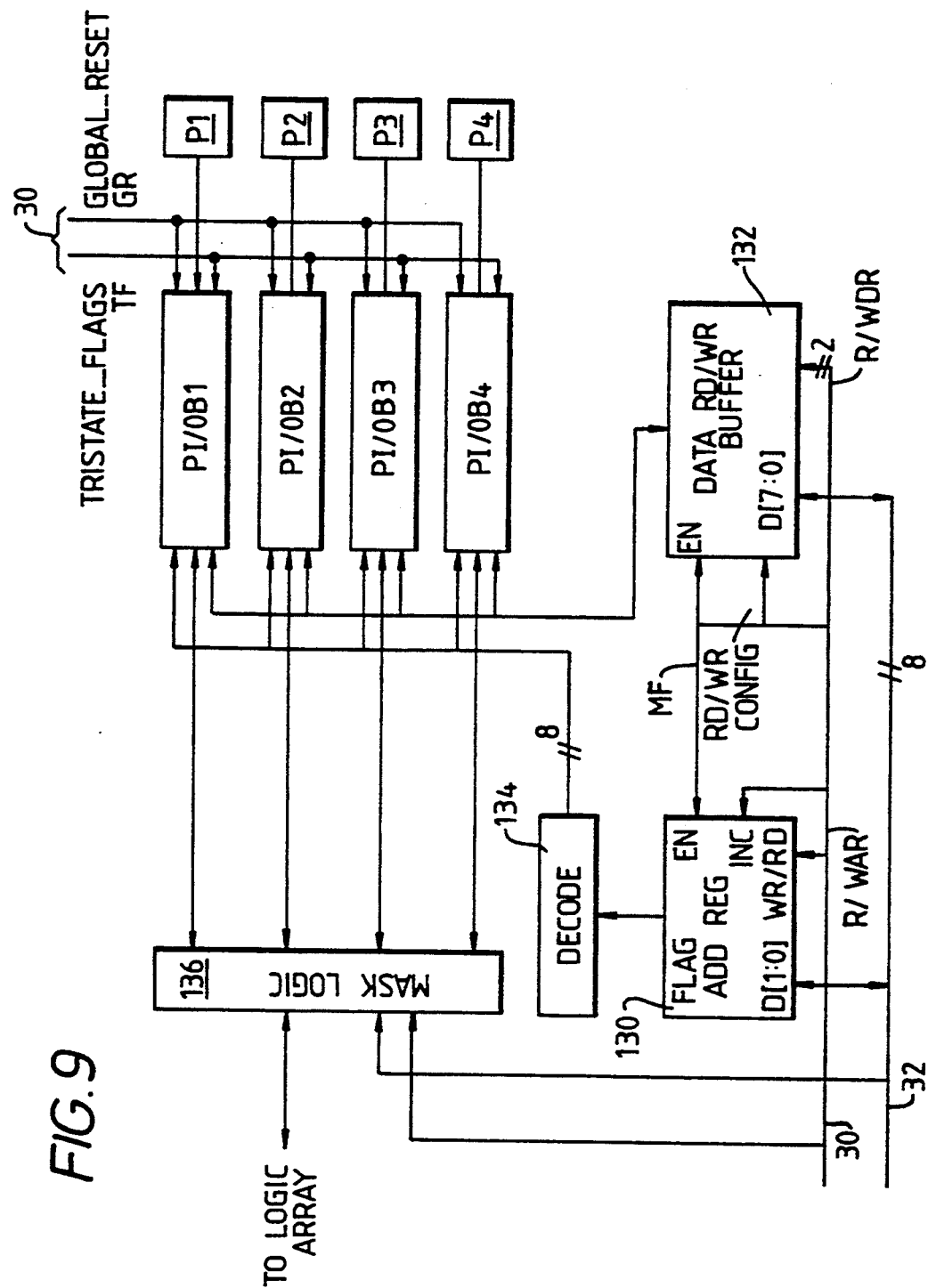
FIG. 9 shows in detail the flag port circuitry.

FIG. 9 shows the circuitry of the communications flag port 28. Configuration circuitry comprises a flag address register 130 and a data buffer 132, enabled by a mode flag signal MF supplied via the configuration control bus 30 along one of the mode lines (FIG. 2). The flag address register 130 is 2 bits wide and is connected to the lowest two bits of the internal data bus 32. The flag address register 130 is loaded/read from/onto the internal data bus 32 under control of the read/write Address register signals R/WAR supplied by communications control bus 30. Similarly the data buffer 132 is accessed with the read/write data register signals R/WDR. The 2-bit contents of the flag address register 130 are decoded in a decoder 134 to give a 1 of 4 decode output, which selects which one of four programmable input/output buffers PI/OB1 to 4 is to be configured. Each configurable input/output buffer PI/OB1 to 4 is connected to an output pad P1–P4 and can be configured to be either a TTL or CMOS threshold level input buffer, an output, an open collector output (pull down only) stage, or disabled/unused. The programmable input/output buffers PI/OB1 to 4 can be controlled by two control signals. The Global reset signal GR supplied along the configuration control bus 30 resets the configuration in the buffers to the disable state. The tristate flags signal TF output from the mode register 62 in the microprocessor interface 16 (FIG. 2) allows the buffers PI/OB1 to 4 to be temporarily tristate while being configured. Mask logic 136 inhibits the passage of signals to and from the configurable logic array 100 and the programmable input/output buffers PI/OB1 to 4. This gives the host microcomputer system 2 the capability to selectively enable and disable interrupt and direct memory access requests.

Figure 10:
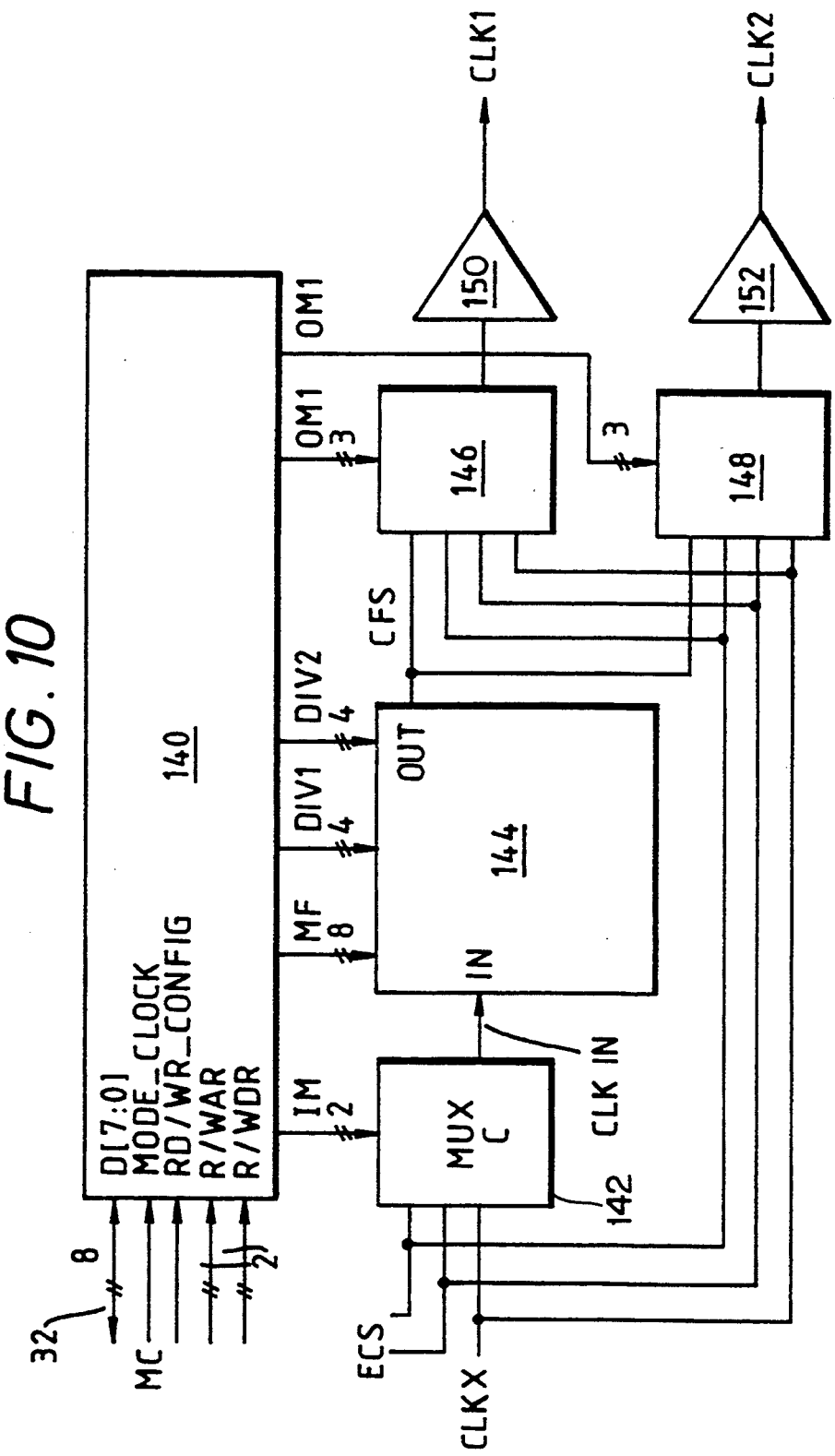
FIG. 10 shows clock generator circuitry.

A block diagram of the clock generator circuitry 22 is shown in FIG. 10. Clock control logic 140 receives a clock mode signal MC, from one of the mode lines of the configuration control bus 30 designating mode (iv), along with read/write address register signal R/WAR, read/write data register signals R/WDR and read/write configure signal RD/WR-CONFIG. The clock mode signal MC enables the clock generator circuitry for configuration. The clock control logic 140 contains configuration data registers and a decode block. It provides control logic output signals as follows: IM, (input mux programming); MFS (Multiplication Factor); and DIV1 and DIV2 (Division factors 1 and 2) to program the operation of the clock generator circuitry. The IM signals condition a multiplexor 142 which determines a reference clock CLK IN for a frequency synthesis circuitry 144. The available sources are as referred to above, namely two external sources ECS 10, host system clock and crystal oscillator, and an internal clock CLKX from the configurable interconnect bus 42. These clock sources are multiplexed into the frequency synthesis circuitry 144 via the multiplexor 142. The output multiplex clock signals OM1 and OM2 from the clock control logic 140 determine which of the available clock sources is used to generate the two clock outputs CLK1 and CLK2. The clock signals OM1 and OM2 are supplied to respective Output multiplexors 146 and 148 which can be programmed to invert the output clock signals. There are two output buffers 150 and 152 which provide a high current drive stage, to drive the signals around the chip. The frequency synthesis circuitry 144 is programmed with the signals MF, DIV1 and DIV2, from the control logic circuitry 140 as discussed in more detail with reference to FIG. 11.

Figure 11:
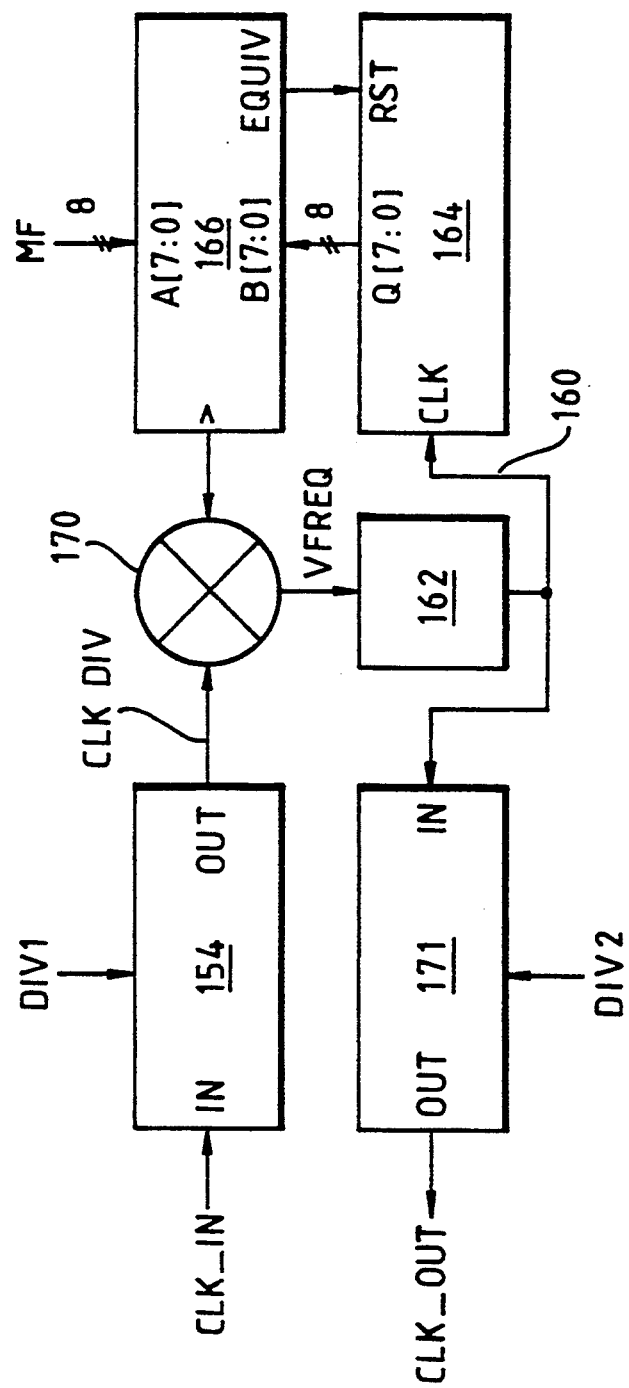
FIG. 11 shows frequency synthesis circuitry of FIG. 10.

In FIG. 11, the reference clock CLK IN is initially divided down by an input clock divider 154 to produce an output CLK DIV oscillating at between 500KHz and 1MHz. The factor of the division, either 1,2,4,8,16,32,64,128 is programmed using the signal DIV1 from the clock control logic 140 of FIG. 10. The output 160 of an internal voltage controlled oscillator 162, clocks an 8 bit counter 164 the output of which is compared by a comparator 166 with a programmable 8 bit multiplication factor MFS from the clock control logic 140. When the count value is equal to the multiplication factor signal MFS a flag is set. The event of the flag being set is compared against the next rising edge of CLK DIV by a phase delay comparator 170 which provide a controlling voltage frequency VFREQ so that any offset between the two events is corrected for by raising or lowering the frequency, thereby increasing or decreasing the frequency of oscillation of the VCO 162. The 8 bit counter 164 is reset over lead RST when the output of the 8 bit counter 164 and the programmed 8 bit value are identical; the count then resumes.

The output 160 of the VCO is divided down by an output clock divider 171, the division factor being programmed by the signal DIV2 from the clock control logic 140, to give 1,/2,/4,/8,/16 .../16384,/32768.

Figure 12:
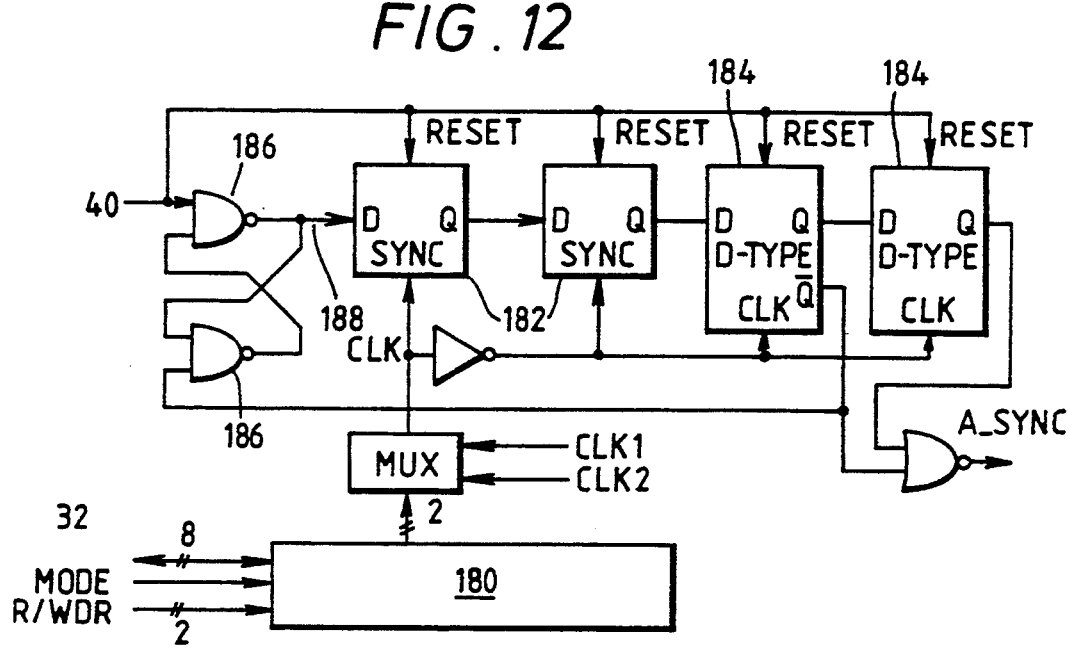
FIG. 12 shows synchronisation circuitry.
Figure 13:
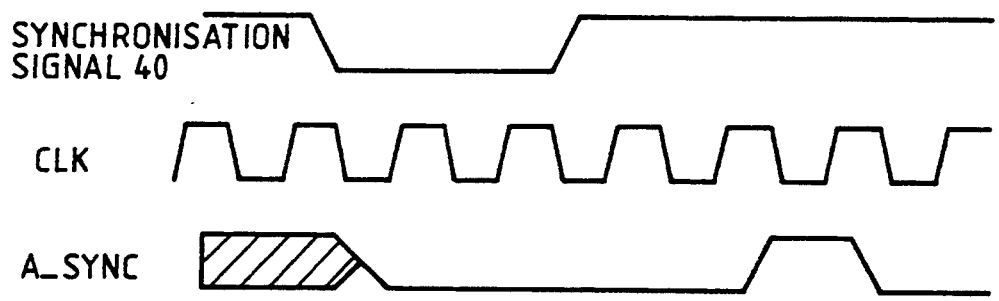
FIG. 13 shows a timing diagram for FIG. 12.

FIG. 12 shows the synchronisation generator 24 circuitry SG which generates the signal A-SYNC 38. This circuitry produces a pulse synchronous to the internal clocks CLK1 and CLK2 from an asychronous access to the communication registers as shown in FIG. 13. The circuitry blocks labelled sync in FIG. 12 are asychronously resetable strong feedback D-type latches optimized for resolving metastable states.

A synchroniser configuration register 180 contains a 2 bit value, loaded from the internal data bus 32 when the device is in "configure synchronisation signal generator mode (vi)" under control of the R/WDR signals on the configuration control bus 30. The two bit value stored in 180 selects which of the clocks; CLK1 or CLK2, the output signal 38 is to be synchronous with.

Sychronisation signal 40 from the microprocessor interface is connected to the reset input of synchroniser circuits 182 and d-type flip-flops 184. Signal 40 sets the set-reset flip-flop formed by a cross-coupled NAND gate pair 186. The resultant signal 188 is input to the synchroniser chain 182 followed by flip-flops 184. Signal 192 is fed back to the reset input of NAND gate pair 186. The A-SYNC signal 38 forms a logic pulse of duration 1 clock cycle after signal 40 goes high. This is shown in FIG. 13. The operation of the circuit should be readily understood from the schematic in FIG. 12 by those skilled in the art.

Peripheral Controller Operation

In operation the host microcomputer 2 sends to the peripheral controller 14, over the data bus 52, a configuration file to configure the peripheral controller 14 for the peripheral transfer operation required. The configuration file consists of an 8-bit identification code followed by a series of configuration data words. The configuration data words are distributed to appropriate functional blocks within the peripheral controller 14 using the mode register 62 and the internal register decoder 60, in the microprocessor interface 16, under the control of the address bus 50 from the microprocessor 4. The configurable logic array 18 is conditioned by the configuration data words received to employ the communication registers 102 and 104 as data registers for the required peripheral transfer operation, while the sequencing of the operations needed for the transfer operation will be created by the setting of the logic array 100.

Similarly the configuration data words will be used, distributed by the internal data bus 32 under the control of the configuration control bus 30 driven from the address data in the configuration file, to set up the programmable line drivers/receivers 20, in accordance with the line requirements for the particular peripheral device to be served in the transfer. The synchronisation generator 24 and the clock generator 22 will also be configured as required by the data from the configuration file.

Thereafter the peripheral transfer operation takes place with data being passed between the communication registers 26 in the peripheral controller 14 and ultimately to or from the microprocessor data bus 52. The progress of the peripheral transfer is monitored by the configurable logic array circuits which drive the communication flag port 28, which was previously configured according to the peripheral transfer requirement, creating interrupt requests or acknowledgements or Direct Memory Access demands as appropriate to the transfer operation.

Figure 14:
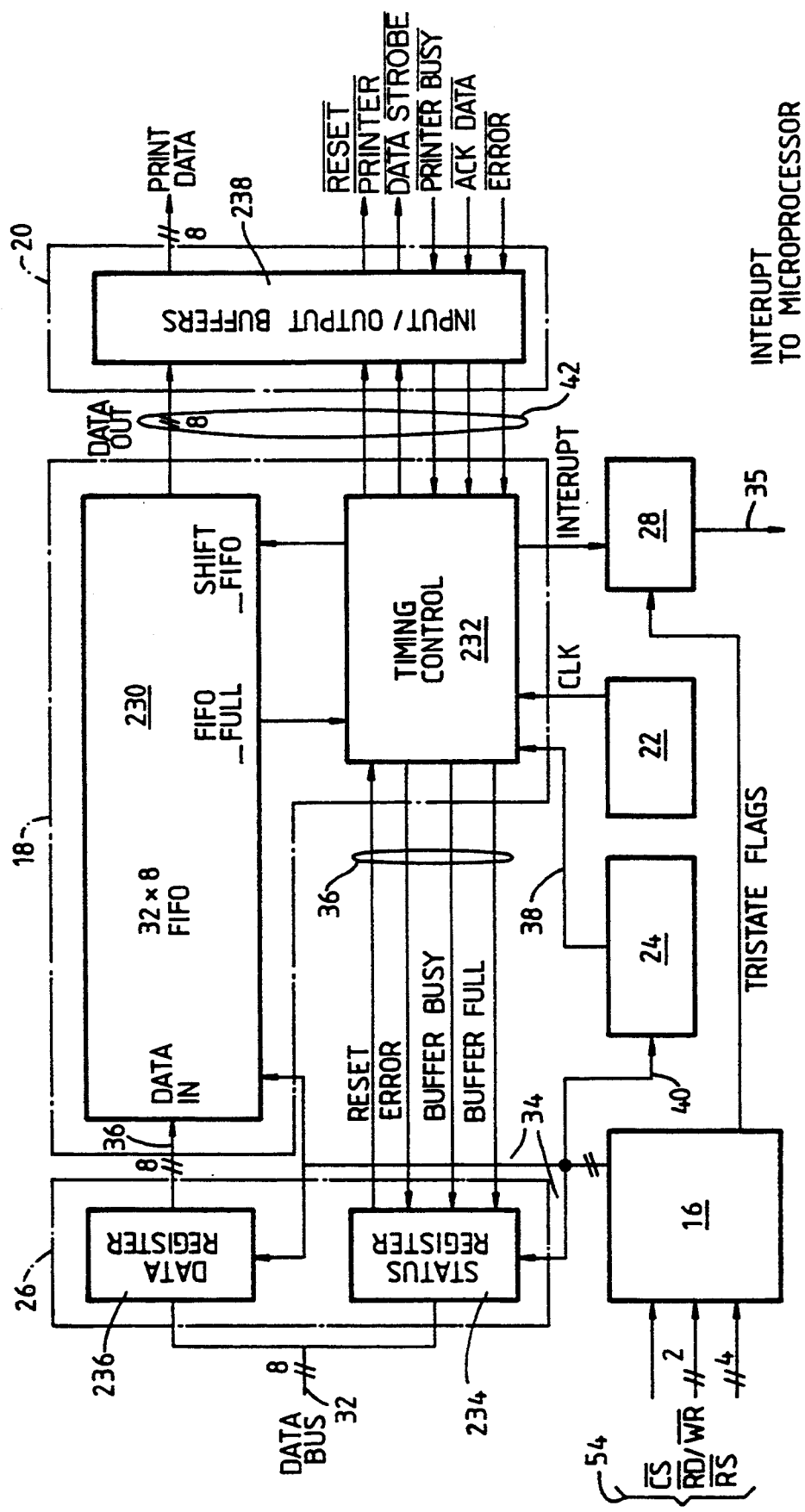
FIG. 14 shows a block diagram of the peripheral controller configured to act as an implemented interface for a printer.

The operation of the configurable peripheral controller will now be described by an example of a printer interface with a 32 character buffer store which generates an interrupt when empty. FIG. 14 shows, in block diagram form, the peripheral controller configured in accordance with the interface to be implemented.

Firstly, the microcomputer system 2 must be configured to implement the required interface function. The exact format for this will vary from system to system, but for the purposes of this example we will assume that a printer setup command is input to the command line.

e.g.

> setup printer

This setup command performs two functions:
1. Configures the peripheral controller hardware to perform the printer function.
2. Installs the printer device driver into the computer system. (Installing a device driver is readily understood by those skilled in the art). A device driver provides the low level interfacing functions between hardware and software.

A configuration file is stored on the hard disk (or similar storage means) in the computer system. The setup command runs a program which transfers the configuration file from that storage means to the peripheral controller.

The configuration file sets the clock generator circuitry 22 to the correct operating frequency, the input and output functionality of the programmable Line drivers/receivers 20 and communication flag ports, and also the "user" logic circuits to be implemented on the configurable logic array 18. In this case, the logic array 18 is configured to implement a first in/first out buffer FIFO 230 and timing control 232.

The peripheral controller and the computer system is now fully configured, software and hardware, to drive a standard printer interface. A schematic representation of the implemented printer interface circuit is shown in FIG. 14.

The user can now initiate a file print operation by typing the appropriate command on the command line. e.g.

> print "filename"

The file to be printed is located by the microcomputer operating system and characters (in the form of an 8-bit binary code—usually ASCII) transferred via the software device driver to the peripheral controller 14.

The software driver continuously checks the Status of the print operation, by accessing a status register 234, to determine: if an error has occurred in the transfer (e.g. printer out of paper): the internal FIFO (First In First Out buffer) is full: or the interface is currently busy streaming data from the FIFO buffer to the printer.

If the Interface is in a position to accept data, the software driver transfers 32 bytes of data to the FIFO buffer via the data register 236.

The Buffer Full flag in the status register is then set to indicate to the microprocessor that no further data can be accepted.

Before the data is transferred to the printer the Buffer Busy flag is set to indicate that the interface is now busy.

Figure 15:
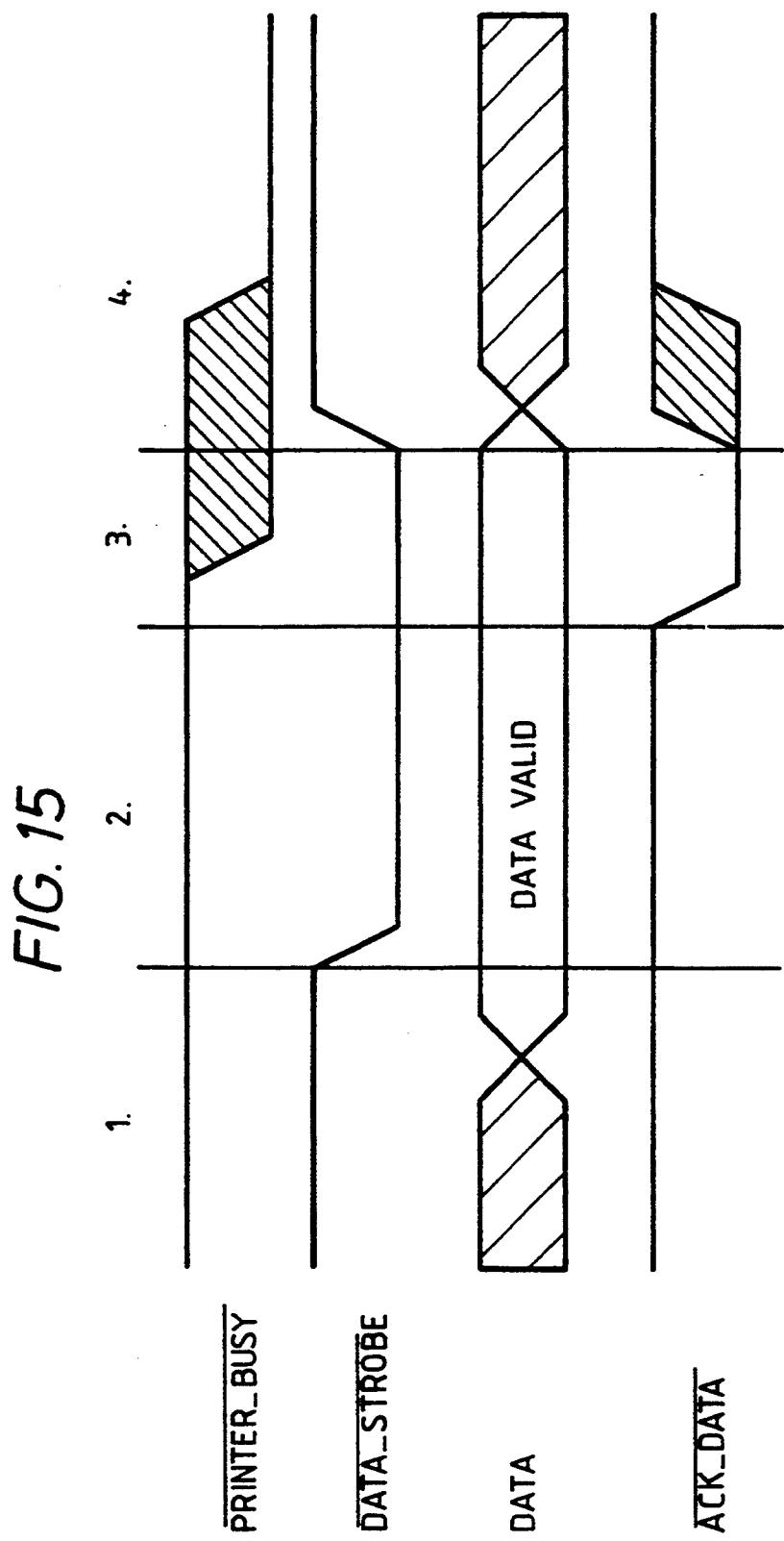
FIG. 15 shows waveforms for the operation of FIG. 14.

The data transfer to the printer is now initiated. The timing control circuitry 232 "handshakes" the data transfers to the printer as shown in FIG. 15.

The timing control circuitry 232 waits until the printer busy signal is negated, then places the data byte onto the data lines. It then asserts the data strobe signal, indicating to the printer that valid data is present. The data is continuously driven by the interface until an acknowledge data (Ack Data) signal is asserted. Data strobe is then negated and the interface prepares to transmit another byte of data.

Successive data bytes are shifted out of the FIFO 230 by the timing control circuitry 232 by means of a Shift FIFO signal. Once all the buffered data bytes have been transferred in this matter, the Buffer Busy and Buffer Full flags, in the status register, are negated.

The Microprocessor system may either continuously "pole" the status register to determine when the transfer has been completed and new data loaded into the buffer or, alternatively, the print operation may be scheduled as a "background" process with the interface generating an interrupt request for more data when a 32 byte transfer is complete. The latter option is a commonly used technique that permits the microprocessor to perform other operations whilst communicating with a slow peripheral device, such as a printer for example.

The printer interface is mapped onto the Peripheral controller 14 as follows.

The data and status registers are implemented using the communication registers 26 addressed directly from the microprocessor interface 16.

The microprocessor interface 16 performs the same function for the printer interface implementation.

The synchronisation generator 24 provides an access synchronisation pulse A-SYNC for the timing control circuitry 232.

The clock generator 22 provides the system clocks for the timing control circuitry 232.

The microprocessor interrupt 35 is driven through the communication flag port 28 and may be enabled/-disabled through the microprocessor interface 16.

The Input/Output buffers 238 are implemented with the programmable line drivers 20.

The FIFO and Timing control circuitry are the only circuits implemented on the configurable logic array 18.

This example demonstrates the versatility of the re-configurable peripheral controller 14 by providing a combination of the commonly used interface circuit structures, e.g. Line drivers, communication registers etc. whilst using the programmable logic circuits to implement the circuitry which is specific to each type of interface.

With a configurable peripheral controller according to the embodiment of the invention it will be recognised that a wide range of peripheral equipments can be accommodated by the peripheral controller dynamically. The addition of new peripherals to a system is substantially eased with a re-configurable peripheral controller according to the invention since all that is required is a new configuration file in the microprocessor memory and a device driver. Typically new configuration files may be distributed to a user incorporating the new peripheral device by including a floppy disk with the peripheral device package. The floppy disk would carry the configuration file/files required for the peripheral transfers to be used with the new peripheral device.

The re-configurable peripheral controller of the invention has the particular advantage that the addition of a new peripheral to the system does not require any corresponding installation of dedicated interfacing hardware. To accommodate a new peripheral the system will be loaded with the corresponding device driver and the configuration file to configure the peripheral controller in use to the implemented interface necessary for the added peripheral device. Similarly different peripherals may be driven from a single port using the re-configurable properties of the peripheral controller to accommodate the different transfer requirements. Further the re-configurable peripheral controller may be provided with a number of peripheral ports each having its own configurable driver/receiver and termination equipment.

The peripheral controller of the invention may conveniently be fabricated as a single semi-conductor integrated circuit device.

The invention has been described with reference to its embodiment in a microcomputer system, however, it will be appreciated by those skilled in the art that the re-configurable peripheral controller of the invention could be used in conventional computer systems generally.

The present invention thus provides a system which supports both bidirectional and unidirectional signal transfer through the line driver receiver circuitry and this gives a more flexible bidirectional data transfer capability which allows the peripheral to communicate with a wider range of peripherals.

TABLE 1

|  | 8-BITS | MODE REGISTER SELECT |
|---|---|---|
| (i) | X X X 1 0 0 0 X | NORMAL OPERATION |
| (ii) | X X X 1 0 0 1 0 | CONFIG. CLA & COMMREG |
|  | X X X 1 0 0 1 1 | READ CLA & COMMREG CONFIG. |

TABLE 1-continued

| | 8-BITS | | | | | | | | MODE REGISTER SELECT |
|---|---|---|---|---|---|---|---|---|---|
| (iii) | X | X | X | 1 | 0 | 1 | 0 | 0 | CONFIG. LINE DRIV./REC. |
| | X | X | X | 1 | 0 | 1 | 0 | 1 | READ LINE DRIV./REC CONFIG. |
| (iv) | X | X | X | 1 | 0 | 1 | 1 | 0 | CONFIGURE CLOCK GEN. |
| | X | X | X | 1 | 0 | 1 | 1 | 1 | READ CLOCK GEN CONFIG |
| (v) | X | X | X | 1 | 1 | 0 | 0 | 0 | CONFIG. COMM FLAG PORT |
| | X | X | X | 1 | 1 | 0 | 0 | 1 | READ COMM. FLAG PORT |
| (vi) | X | X | X | 1 | 1 | 0 | 1 | 0 | CONFIG. SYNC GEN |
| | X | X | X | 1 | 1 | 0 | 1 | 1 | READ SYNC GEN CONFIG |
| (vii) | X | X | 0 | X | X | X | X | X | (GR) GLOB_RST (ALL BLOCK) |
| | X | 0 | X | X | X | X | X | X | TRISTATE LINE DRIVERS TL |
| | 0 | X | X | X | X | X | X | X | TRISTATE FLAG PORT TF |

What is claimed is:

1. A peripheral controller suitable for connecting a selected one of a plurality of peripheral devices to a computer system comprising a processor, a memory and a direct memory access controller interconnected by a system control bus, the peripheral controller comprising a plurality of programmable line driver/receiver devices each capable of operating selectively in a unidirectional signal transfer mode in which the transfer of signals between the computer system and the selected peripheral device is in a selected one of input and output directions and in a bidirectional signal transfer mode when the transfer of said data is in both said input and output directions; and a re-configurable logic array adapted to be configured to implement a particular interface required for the selected peripheral device under the control of configuration control data generated by the processor and communicated to the peripheral controller, said configuration control data also being useable to place at least one of the programmable line driver/receiver devices into an appropriate one of said signal transfer modes whereby the peripheral controller is capable of implementing transfer of signals between the computer system and the selected peripheral device under the control of the processor.

2. A peripheral controller as claimed in claim 1, which further comprises programmable clock generation means including frequency synthesis means.

3. A peripheral controller as claimed in claim 1 which further comprises a synchronisation generator capable of producing a synchronisation signal to enable the computer system to communicate with the peripheral controller in an asynchronous manner, said synchronisation generator being operable to resolve metastable conditions.

4. A peripheral controller as claimed in claim 1 further comprising programmable communication registers arranged to be used in the transfer of data and control words between the computer system and the particular interface implemented on the configurable logic array.

5. A peripheral controller as claimed in claim 1 further comprising a communication flag port connected between the configurable logic array and the direct memory access controller via the system control bus and adapted to control communication between the configurable logic array and the host computer system.

6. A peripheral controller as claimed in claim 1 further comprising an internal data bus and a configuration control bus arranged to receive data from the system control bus under the control of a bus interface for the distribution of the configuration control data to the configurable logic array and the programmable line driver/receiver devices and to the programmable communication registers, the synchronisation generator, the clock generator and the communication flag port, when present, to configure the peripheral controller.

7. A peripheral controller as claimed in claim 6 in which the communication flag port in operation may be enabled/disabled under control of the bus interface.

8. A peripheral controller as claimed in claim 1 in which the configurable logic array is of a type claimed in U.K. Pat. No. 2180382B.

9. A peripheral controller as claimed in claim 2 in which the frequency synthesis means comprises:
 a voltage controlled oscillator producing an output signal and a compare signal at a frequency dependent on a control voltage;
 input clock divider means for producing a first clock signal;
 a phase comparator for comparing the phase of the first clock signal with a second clock signal and producing the control voltage in dependence on the phase difference;
 a counter and comparator means for providing said second clock signal when a count of pulses of the compare signal equals a preset number.

10. A peripheral controller as claimed in claim 1 in which each programmable line driver/receiver device comprises:
 means for selecting the direction of a line signal when operating in said bidirectional signal transfer mode.

11. A peripheral controller as claimed in claim 10 in which each programmable line driver/receiver device comprises input/output multiplexing means.

12. A peripheral controller as claimed in claim 10 in which each programmable line driver/receiver device comprises a programmable output current drive selector having independently programmable current sink and source arrangements.

13. A peripheral controller as claimed in claim 10 in which each programmable line driver/receiver device comprises a programmable input voltage threshold level selector.

14. A peripheral controller as claimed in claim 10 in which each programmable line driver/receiver device comprises programmable value pull up and down resistors for signal termination.

15. A peripheral controller as claimed in claim 10 in which each programmable line driver/receiver device comprises storage means for retaining programmable line driver/receiver configuration data.

16. A peripheral controller as claimed in claim 1 and fabricated as a single semiconductor integrated circuit device.

17. A microcomputer system incorporating a peripheral controller according to claim 1.

18. A method of operating a computer system comprising a processor, a memory, a direct memory access controller, a peripheral controller and a plurality of peripheral devices connected to the peripheral controller, the peripheral controller comprising a plurality of programmable line driver/receiver devices each capable of operating selectively in a unidirectional signal transfer mode in which the transfer of signals to and from the selected peripheral device is in a selected one of input and output directions and in a bidirectional signal transfer mode when the transfer of said signals is in both said input and output directions, the processor, memory, direct memory access controller and peripheral controller being interconnected by a processor system control bus, the computer system further comprising a reconfigurable logic array adapted to be configured to implement a particular interface required for the selected peripheral device, wherein the method comprises the steps of: communicating a configuration file from the processor over the processor system control bus; programming said programmable line driver/receiver devices to place at least one of the programmable line driver/receiver devices into an appropriate one of said signal transfer modes; and configuring said reconfigurable logic array thereby to configure the peripheral controller in accordance with the interface requirements of a selected one of the peripheral devices.

* * * * *